United States Patent [19]

Gilmore

[11] 4,222,671
[45] Sep. 16, 1980

[54] STATIC MIXER

[76] Inventor: Oscar P. Gilmore, 2804 Shenandoah Rd., Riverside, Calif. 92506

[21] Appl. No.: 939,816

[22] Filed: Sep. 5, 1978

Related U.S. Application Data

[62] Division of Ser. No. 670,388, Mar. 25, 1976, Pat. No. 4,112,520.

[51] Int. Cl.³ .............................................. B01F 5/24
[52] U.S. Cl. .................................................. 366/337
[58] Field of Search ............... 366/336, 337, 338, 339, 366/340, 341

[56] References Cited

U.S. PATENT DOCUMENTS

| | | |
|---|---|---|
| 2,512,471 | 6/1950 | Trist . |
| 2,847,196 | 8/1958 | Franklin et al. |
| 2,894,732 | 7/1959 | Taber et al. |
| 3,051,452 | 8/1962 | Nobel . |
| 3,051,453 | 8/1962 | Sluijters . |
| 3,089,683 | 5/1963 | Thomas et al. |
| 3,128,794 | 4/1964 | Boucher et al. |
| 3,182,965 | 5/1965 | Slyijters . |
| 3,195,865 | 7/1965 | Harder . |
| 3,206,170 | 9/1965 | Schippers et al. |
| 3,239,197 | 3/1966 | Tollar . |
| 3,286,992 | 11/1966 | Armeniades et al. |
| 3,328,003 | 6/1967 | Chisholm . |
| 3,358,749 | 12/1967 | Chisholm . |
| 3,394,924 | 7/1968 | Harder . |
| 3,404,869 | 10/1968 | Harder . |
| 3,406,947 | 10/1968 | Harder . |
| 3,417,967 | 12/1968 | Richens et al. ...................... 366/144 |
| 3,470,912 | 10/1969 | Bydal . |
| 3,506,244 | 4/1970 | Strang ................................. 366/176 |
| 3,583,678 | 6/1071 | Harder ................................ 366/340 |
| 3,623,704 | 11/1971 | Skobel ................................ 366/337 |
| 3,643,927 | 2/1972 | Crouch . |
| 3,652,061 | 3/1973 | Chisholm . |
| 3,827,676 | 9/1974 | Brasie . |
| 3,827,888 | 9/1974 | Terwilliger et al. ................. 366/339 |
| 3,831,904 | 9/1974 | Appledoorn et al. ............... 366/337 |
| 3,856,270 | 12/1974 | Hemker .............................. 366/340 |
| 3,860,217 | 1/1975 | Grout ................................. 366/336 |
| 3,949,970 | 4/1976 | ter Braak . |

OTHER PUBLICATIONS

*Mertering and Mixing Machines for Dispensing*, Kenics Corp.
*Solutions to Dispensing Problems*, Kenics Corp. pp. 1-3.
*Process Control and Mixing*—Bulletin 103, Komax Systems Inc.
*Thomas Register Catalog File* Ross, Charles & Son, Co., p. R-9.

*Primary Examiner*—Billy S. Taylor
*Attorney, Agent, or Firm*—Herbert E. Kidder

[57] ABSTRACT

A static mixer for streams of flowing materials comprises a flow passage defined in a laminated body having end plates and a number of intermediate plates all detachably interconnected to form a unitary structure. The flow passage follows a serpentine path, crossing and recrossing boundaries between the several plates. Mixing structures are formed in the passage for combining, dividing and recombining streams of flowing materials in the passage by means of rotation of flow path and altering the cross-sectional shape of the flow paths. Disassembly of the several plates of the laminated body permits easy access to individual sections of the flow passage to facilitate cleaning and repair. Flow passage sections extend along a path that bends about an axis perpendicular to the direction of flow therein to facilitate mixing and to achieve curvature of the path to enable it is cross and recross the several boundary surfaces between adjacent plates and the laminated body. Flow rotator sections are positioned in intermediate plates to provide a linear flow path. The mixer may employ unique multiple flow rotators either stacked alone or together with flow path bending sections.

2 Claims, 33 Drawing Figures

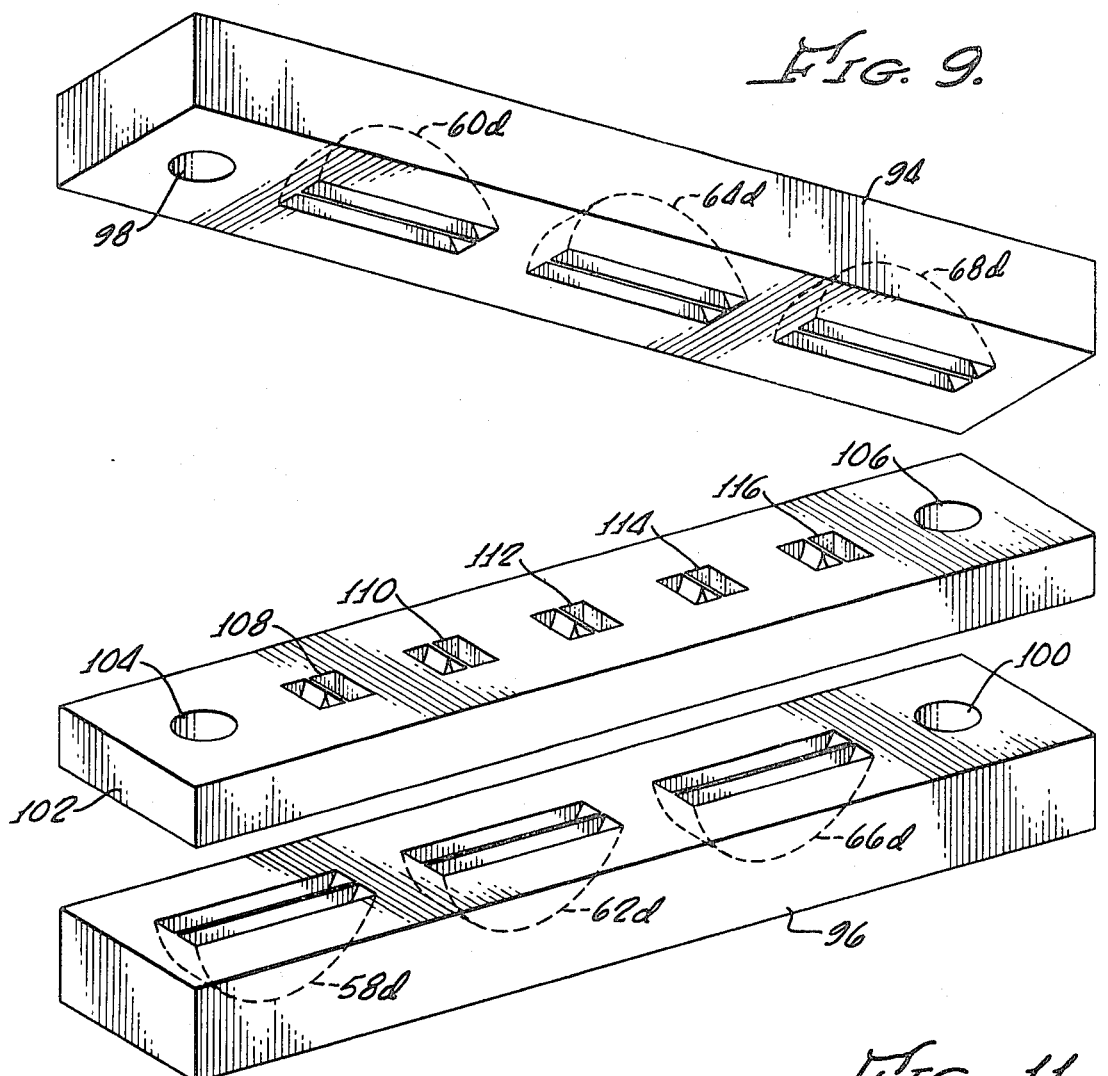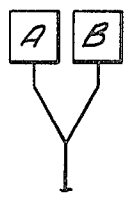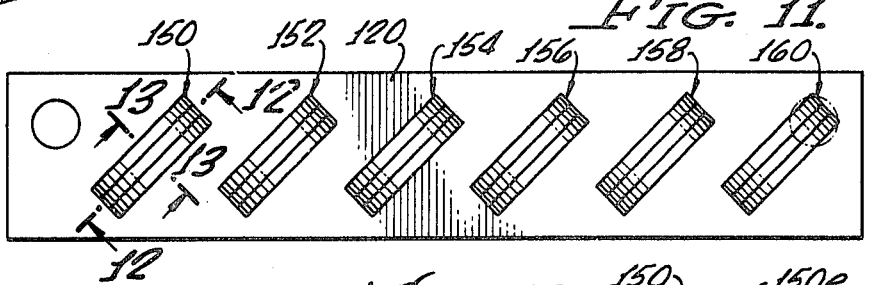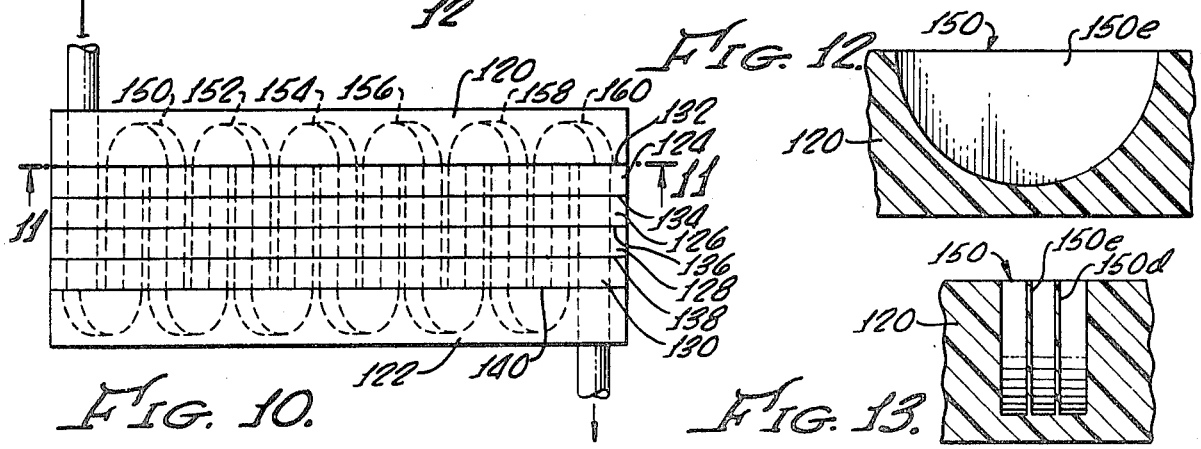

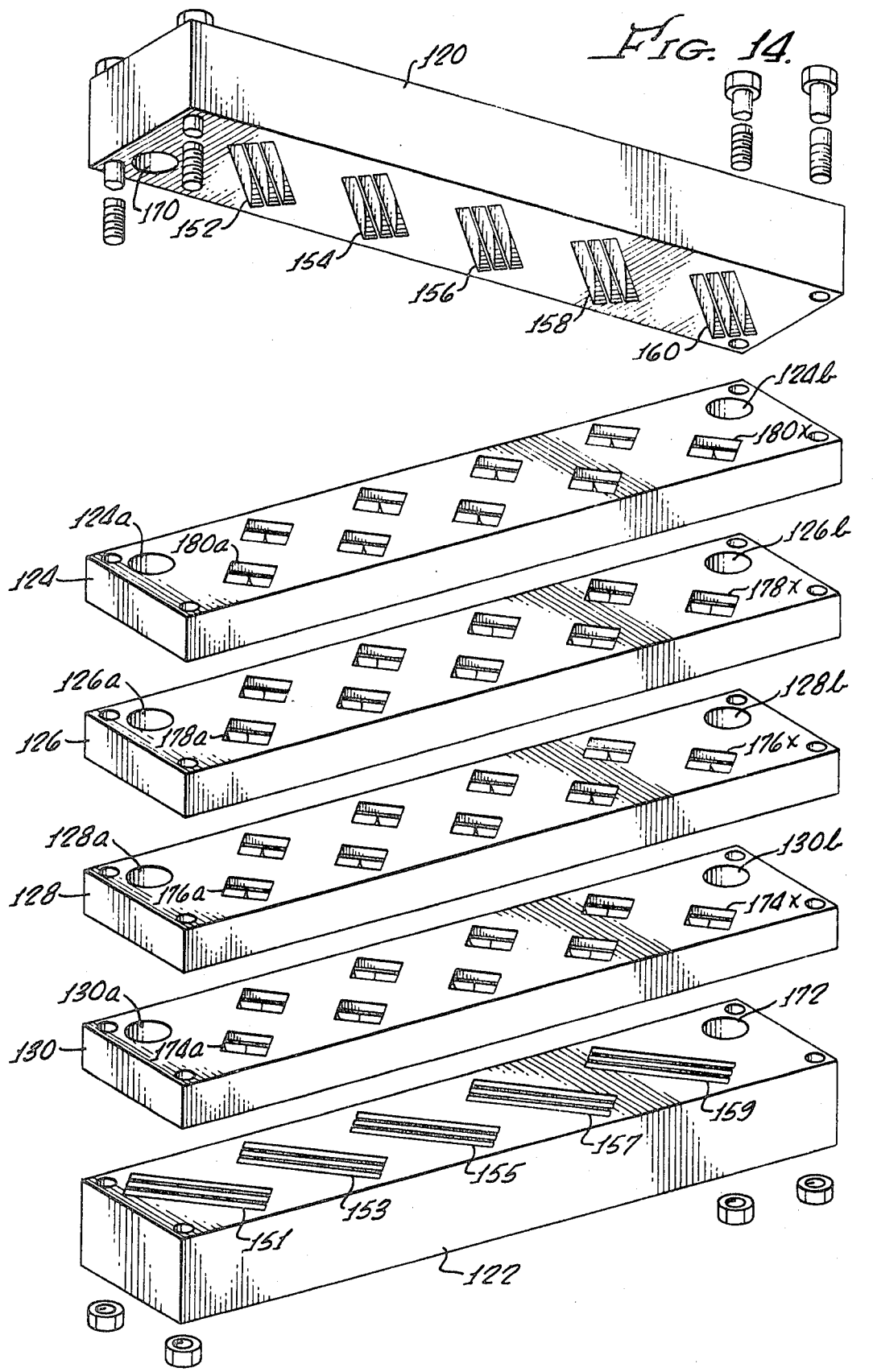

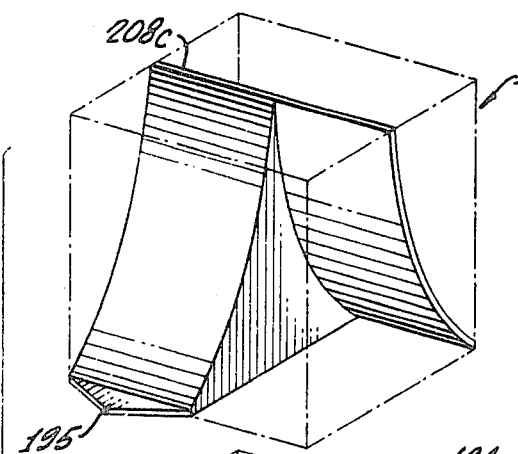
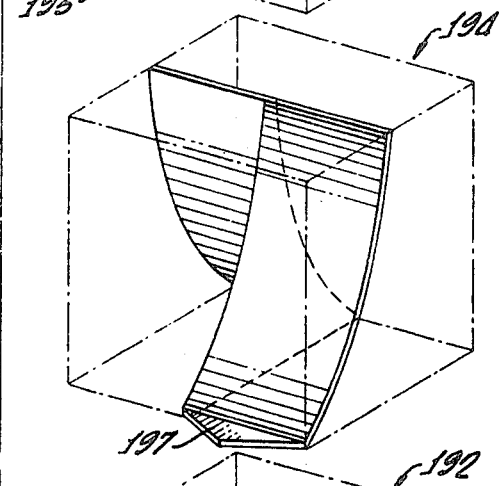
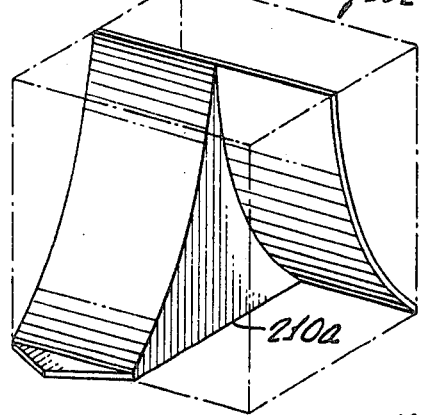
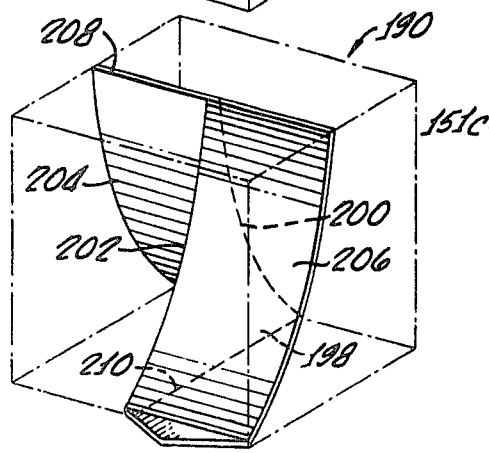
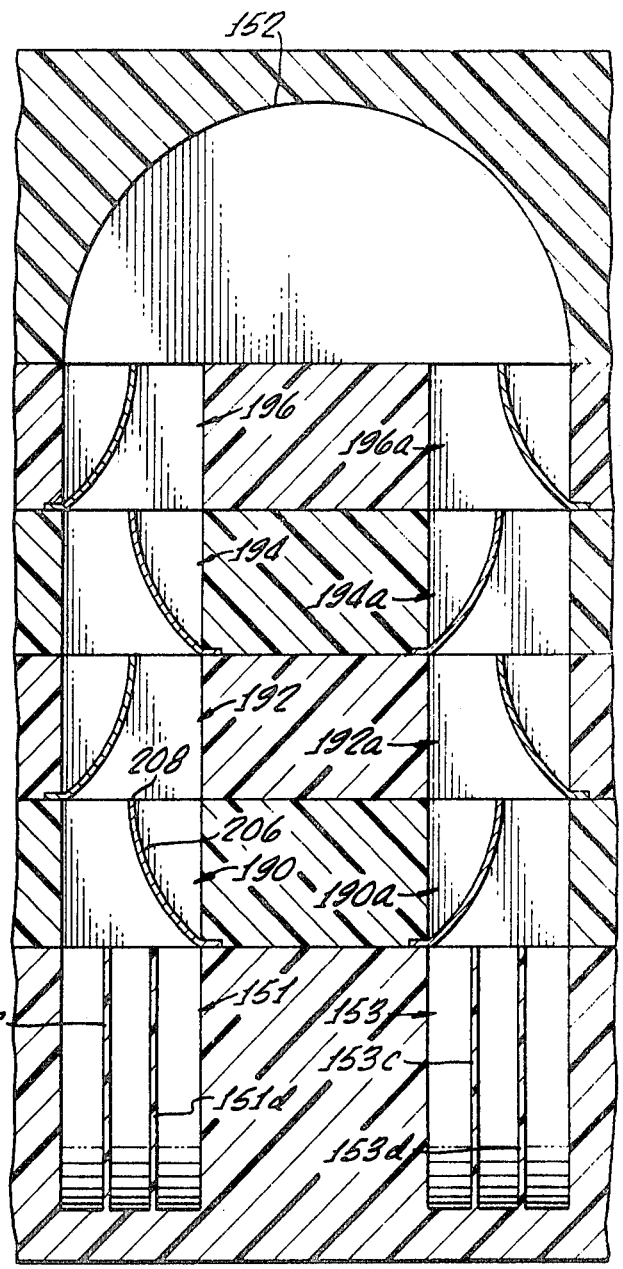
FIG. 15.
FIG. 16.

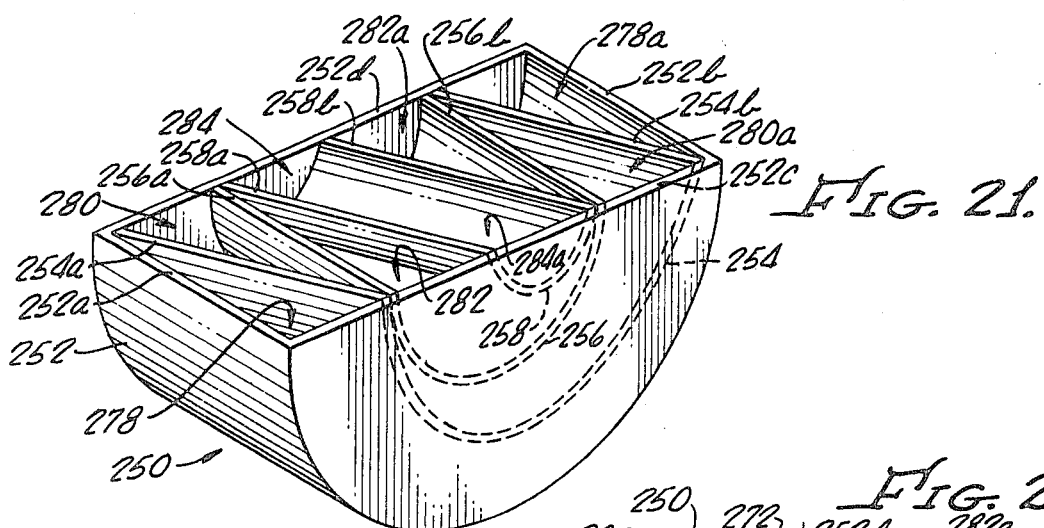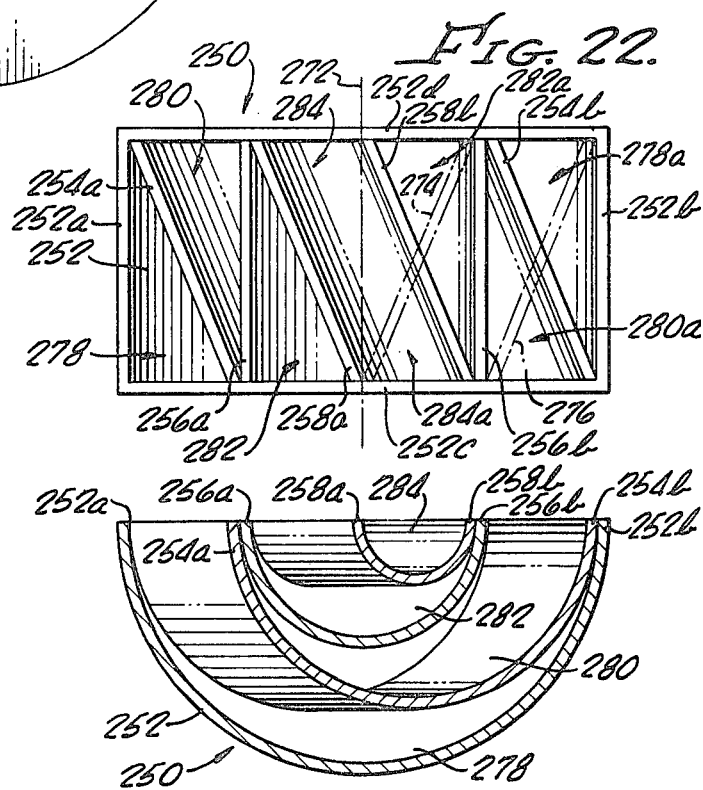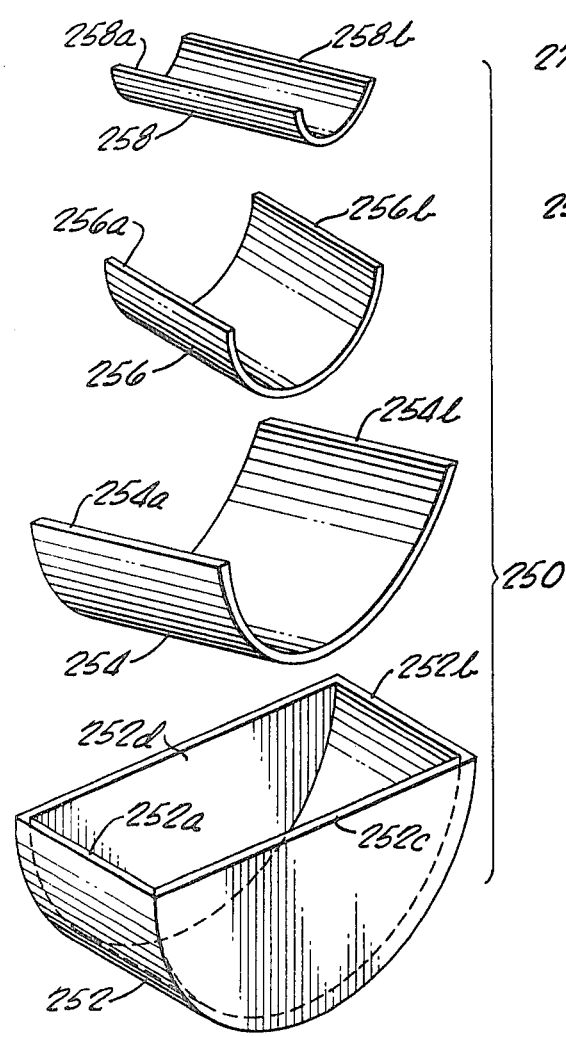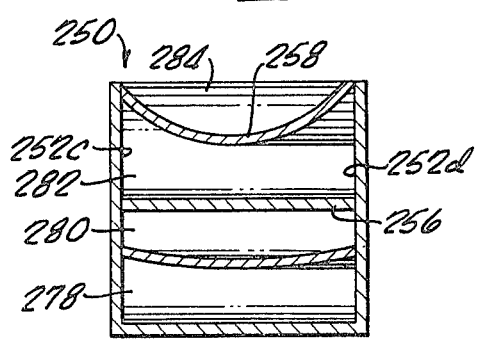

STATIC MIXER

This is a division of application Ser. No. 670,388, filed Mar. 25, 1976, now U.S. Pat. No. 4,112,520.

BACKGROUND OF THE INVENTION

The present invention relates to methods and apparatus for mixing streams of flowing materials and more particularly concerns such mixing without movement of parts other than the flowing material itself.

Static mixers, also termed interfacial surface generators, having a number of advantages over dynamic mixing devices and have been used for some time. Various types of these mixers have been developed, fundamentally employing apparatus for flowing materials and for repetitively combining, dividing and recombining streams of the materials many times. The number of combinations, divisions and recombinations depends upon the degree of mixing required or desired and certain characteristics of materials being mixed, particularly viscosity. Typical of static mixers presently known are those described in U.S. Pat. Nos. 3,051,453, 3,195,865, 3,239,197, 3,328,003, 3,643,927, 3,652,061 and 3,286,992. In general, such static mixers embody an elongated linear flow path in which a number of flow rotators or twisters are provided. Such rotators or twisters divide the flowing stream into two branch streams and effect a mixing of the material within each of the branch streams as it flows through the rotator. This mixing is effected by a configuration of the rotator that causes the material to flow through a rotating or twisting path, rotating about an axis substantially aligned with the direction of flow. By rotating material in each branch stream, radial forces and eddy currents are generated, and thus the material within the stream is mixed. From another point of view, the action of these rotators may be described as a cross-sectional distortion or alteration wherein the branch stream in an upstream end of the rotator has an elongated cross-section with major and minor axes oriented in one direction and, at a downstream end of the rotator, has a similar elongated cross-section but with its major and minor axes oriented in another direction. Thus, the rotator may be considered a device for altering the cross-section of the branch stream or for rotating the stream about its direction of flow.

More viscous materials are more difficult to mix and it is found that a large number of mixing elements or flow rotators are required to effect satisfactory mixing of materials with higher viscosity. Ten or more of such elements may be placed in series in a flow path for viscous materials. For mixing polyester resins such as urethanes, for example, it is common to employ a tube having 30 or more individual mixing or rotating elements mounted in series therein. A commonly employed static mixing device of the type shown in U.S. Pat. No. 3,286,992 is distributed by Kenics Corporation and is available in tubes having from 15 to 27 individual mixer elements positioned therein. For mixing more difficult materials or for obtaining a greater degree of mixing, one must employ more individual mixing or rotating elements, thus requiring a longer tube. The longer the mixing apparatus, the greater are problems of providing space for the mixer, and the greater the back pressure or resistance to flow. However, an even more significant problem arises in the use of the mixer for materials that cure or harden. Unless the device is used continuously or is cleaned immediately after each use, it will become clogged with material that hardens within the tube. This problem is recognized by the patentees Armeniadis et al in U.S. Pat. No. 3,286,992 who state that after a run of resin, for example, or other setting material, it may be advantageous to discard the device rather than attempt to clean it. Obviously, according to the patentees either one or the other must be done as otherwise the resin will set within the tube and render it useless. Thus, the difficulty of employing such static mixers with viscous, settable material, is recognized but the suggested solution is unsatisfactory. In view of the exceedingly high cost of such devices disposability is not economical.

Other problems encountered with existing static mixers include the difficulty of securing the individual mixing elements in desired position and thus arrangements, such as those suggested in U.S. Pat. Nos. 3,652,061 and 3,827,676 have been suggested. These arrangements increase the complexity of manufacture and thus increase the cost.

Schippers et al U.S. Pat. No. 3,206,170 shows a mixer in which a number of pairs of mixer elements are adjoined, but axially directed channels are arranged so that flow division occurs only between pairs of elements and not between elements of a pair.

Accordingly, it is an object of the present invention to provide a static mixer that avoids or minimizes the above-mentioned problems.

SUMMARY OF THE INVENTION

In carrying out principles of the present invention, in accordance with preferred embodiments thereof, a mixer structure defines a flow passage having means therein for combining, dividing and recombining streams of flowing materials. In one embodiment the passage is caused to extend along a path that bends about an axis angulated relative to the direction of flow therein. This arrangement of a bent path allows the passage to extend in a serpentine path and, further, allows the structure in which the passage is formed to comprise first and second sections that are contiguous to each other at a surface which is positioned so that the path of the passage crosses the surface at a plurality of areas. According to a feature of the invention, the passage includes a plurality of flow bend sections positioned along the passage, each providing a flow path that bends about an axis angulated relative to the direction of flow therein. Sections of at least a group of the flow bend sections are provided with means for separating material flowing therein into a plurality of streams or may be provided with means to both separate and rotate the streams while altering their cross-section to obtain mixing. In some embodiments of the invention, one or more flow rotator sections are positioned in the passage between at least one pair of adjacent flow bend sections, the flow rotator sections including means for providing a flow path that twists about the direction of flow therein. In other embodiments of the invention, at least some of the flow bend sections in planes that are angularly positioned relative to the planes of the bends of adjacent flow bend sections and no interposed flow rotator sections are required. Another feature of the invention concerns multiple rotator segments that may be stacked alone or together with flow bend sections. According to another important aspect of the invention the flow path is formed in a plurality of layers or sections that are detachably interconnected to facilitate assembly and disassembly for cleaning.

BRIEF DESCRIPTION OF THE DRAWINGS

FIG. 9 is an exploded perspective view of another form of mechanization of the mixer of FIG. 5;

FIG. 10 is a side view of another embodiment of the mixing system employing end plates having flow bend sections and intermediate plates having flow rotator sections;

FIG. 11 is a section taken on lines 11—11 of FIG. 10;

FIGS. 12 and 13 are sections taken respectively on lines 12—12 and 13—13 of FIG. 11;

FIG. 14 is a exploded perspective view of the mixer of FIG. 10;

FIG. 15 is an exploded view schematically illustrating a plurality of adjacent flow rotator elements positioned between adjacent flow bend sections in the embodiment of FIG. 10;

FIG. 16 schematically illustrates a portion of the flow path of the embodiment of FIG. 10;

FIG. 21 is a perspective view of a modified flow bend section which additionally provides flow rotation and cross-section alteration;

FIG. 22 is a top plan view of the section of FIG. 21;

FIG. 23 is an exploded perspective view of the flow bend section of FIGS. 21 and 22;

FIGS. 24 and 25 are sections of FIGS. 22 and 24 respectively;

DETAILED DESCRIPTION

Figure 1:
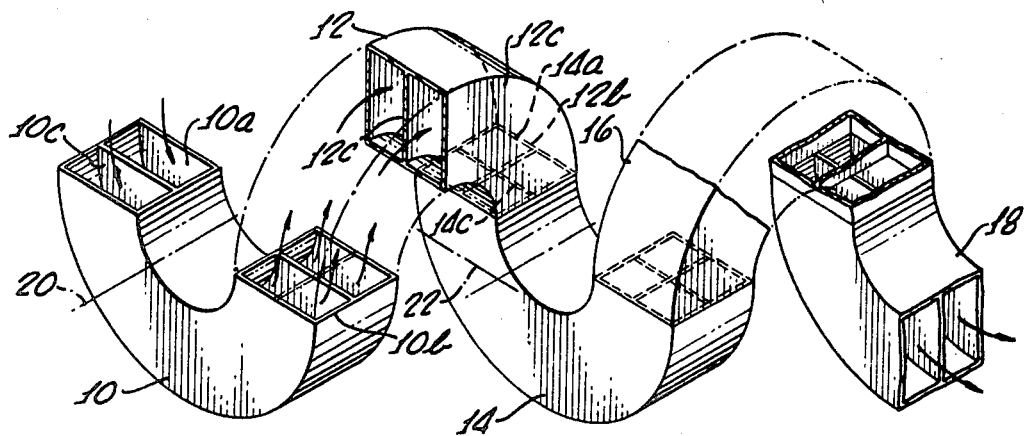
FIG. 1 illustrates an arrangement of flow bend sections interconnected in end to end relation and bending in relatively angularly displaced planes.

As illustrated in FIG. 1 a plurality of flow bend sections 10, 12, 14, 16 and 18 are connected in end to end relation to provide a continuous flow path. Each flow bend section comprises a hollow tube having a substantially rectangular cross-section, although a cross-section of any shape may be employed. Each bend section, such as section 10, has an input end 10a and an output end 10b extending in different directions so that a stream of material will flow through the bend section from the input end to the output end and change its direction in passing through the section. The stream flows along the path defined by the bend section. This path bends about an axis denoted by a line 20 that is angulated relative to the direction of flow in the bend section. Preferably, axis 20 is perpendicular to the direction of flow, although other angles may be employed.

Each bend section includes a substantially planar web or flow divider 10c which extends the length of the flow bend section and also extends across the section from the inner side of the curved section to the outer side of the curved section thereby dividing the section into two substantially parallel and equal flow conduits. Preferably, the web 10c is oriented to be angulated relative to the axis 20 although it may lie at some other angle with respect to the axis, and even may lie in a plane extending at 90° to the plane of the illustrated web 10c (being curved to follow the bend of section 10).

Although the bend section 10 is illustrated as having a configuration smoothly curved about the axis 20, it will be readily appreciated that the flow bend section may have a "bend" configuration other than a smooth curve, provided that the shape is such as to require the flow path to turn about the axis 20. In the embodiment of FIG. 1, the input and output ends 10a and 10b are coplanar and the flow path is bent by 180° about the axis 20 in the bend section 10.

Figure 2:
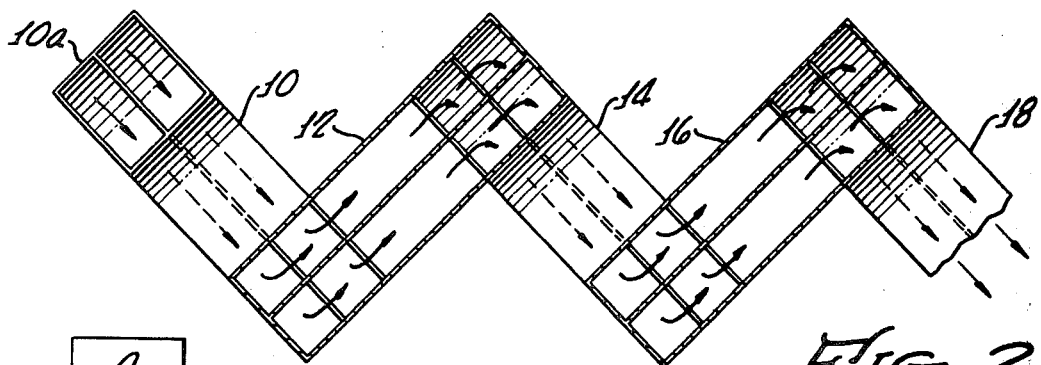
FIG. 2 is a schematic plan view of flow in the embodiment of FIG. 1.

The second bend section 12 (and all subsequent bend sections) are each identical to the bend section 10 and includes a flow dividing web 12c. However, the plane of bend of section 12 is angulated with respect to the plane of the bend of section 10 so that section 12 bends about an axis denoted by a line 22 which is perpendicular to the direction of flow of material in bend section 12. Not only is the plane of bend of section 12 perpendicular to the plane of the bend of section 10 but the axis of the flow path of material flowing in section 12 is at 90° to the axis of the path of material flowing in section 10 (when viewed in plan), as illustrated in FIG. 2. Further, section 12 is rotated 180° so that its input and output ends face downwardly, for example, when the input and output ends of section 10 face upwardly. The output end of 10b of section 10 and the input end 12a of section 12 are contiguous and joined in a mating relation. The adjacent end edges of flow dividing webs 10c and 12c are in contact or nearly in contact with one another and are positioned at 90° to one another. Although an angle of 90° between adjacent web edges is preferred, angles greater or less than 90° may be employed. Angles of greater or less than 90° may also be employed between the planes of bend sections 10 and 12. However, without additional flow rotator sections interposed between adjacent end sections, as will be more particularly described in connection with other embodiments, the planes of bends of sections 10 and 12 must not be aligned.

Flow bend sections 14, 16 and 18 are each identical to the previously described sections but the several sections are alternately inverted and angulated by 90° with respect to the preceeding section just as described in connection with the first two sections 10 and 12. Any number of such sections may be employed as required by the nature of the material and the degree of mixing required.

Figure 3:
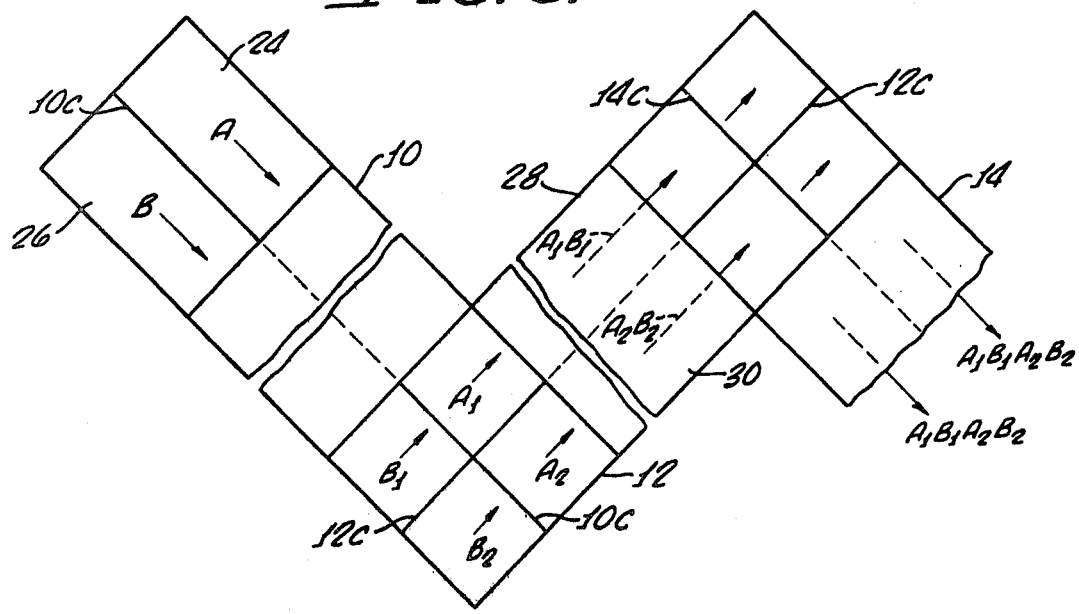
FIG. 3 illustrates flow combining, dividing and recombining action of the apparatus of FIG. 1.

In operation, as depicted in FIGS. 2 and 3, a single stream of two or more flowable materials, such as a gas, a liquid, or a stream of solid particles, is caused to flow into the input end 10a of bend section 10 where it is divided into branch streams by flow divider web 10c. The two branch streams flow through the curved path of the bend section, exiting at the output end 10b where they enter the input end 12a of the second bend section 12. At this junction of ends 10b and 12a, each branch stream is divided by the flow divider web 12c into first and second components and one component of each branch is combined in bend section 12 with one component of a second branch. Two branches are now flowing in bend section 12 but each of these branches comprises a component of one of the branches of section 10 and a component of the outer branch of section 10.

Flowing in these curved bend sections or more specifically, bending about the axis 22 as they flow through bend section 12, the two components in one of the branches are mixed with each other and the two components in the other branch are also mixed with each other. This mixture is due to the bending of the flow path in which a relatively lower flow velocity is provided along the inner side of the bend section and a relatively higher flow velocity is provided along the outer wall of the bend section. The outer wall of the bend section, of course, has a greater length than the inner wall and thus material must flow at a greater velocity and at decreased density or pressure along this outer wall. This flow difference introduces a turbulence in a flow within each branch and provides radial flow components within each branch, flow components which move radially of the bend axis 20 or 22. This turbulent bending flow in each branch causes mixing of the flow material components in each branch.

Thus, some degree of mixing has occurred between the two components flowing in each branch by the time that the material reaches the output end 12b of bend section 12. At this point, the two branches meet the input end 14a of the next bend section 14 which has its flow divider web 14c positioned at 90° with respect to the contiguous or nearly contiguous end of the flow divider web 12c. Thus, each of the branches of the stream flowing in bend section 12 are themselves divided into first and second components by the web 14c and two branches of the flowing stream now pass through the curved path of bend section 14. As previously described, the two components in each of these branches are caused to mix with each other due to the bending of the flow path in bend section 14, and still further mixing occurs. This operation continues as the material flows from bend section 14 to bend section 16 and then to bend section 18 and so on until the end of the entire flow passage of the desired number of bend sections has been reached. At each junction of a pair of adjacent bend section, each branch flowing from the preceeding section is divided, a component of one branch is combined with the component of another and the two are mixed as they flow through the subsequent branch. These successive divisions and recombinations continue throughout the length of the passage.

This combination and recombination may be more specifically explained in connection with the schematic diagram of FIG. 3 which shows flow branches labeled A and B flowing in conduit sections 24 and 26, respectively, of a first flow bend section, such as section 10, for example. The two flowing branches A and B are separated by flow divider web 10c. At the junction of sections 10 and 12 each branch is divided into two components, A1, A2 and B1, B2, respectively, by means of flow divider web 12c of the section 12. Components A1 and B1 flow together in a first conduit 28 on one side of the web 12c and components A2 and B2 flow together in a second conduit 30 on the other side of the web 12b. Components A1 and B1 flow together through the curved conduit 28 and are mixed to some extent as previously described. Similarly, components A2 and B2 flow together through the curved or bent conduit 30 and are mixed together. At the junction between bend sections 12 and 14, each recombined branch A1, B1 and A2, B2, is invididually split or divided into two components by the flowing dividing web 14c at the input end of bend section 14, and a similar recombining and mixture of components occurs in this bend section. This same action continues at each junction and through each section, with each branch that exits from any one bend section being divided into two components at the entrance to the next section and a component of one branch being combined with a component of another branch.

A significant advantage that derives from the use of mixer divider elements (bend sections) that bend about an axis angulated with respect to the direction of flow is the fact that flow division may be accomplished by simple planar elements, such as the planar web 10c, 12c, etc. Because these elements are planar and are not twisted or otherwise of a distorted shape, as in the prior flow rotator or cross-section altering devices, it is convenient to employ two or more such flow divider webs in a single bend section. The number of such flow divider webs employed in a single bend section will vary with the type (and viscosity) of material being handled and the degree of mixing required. Thus, although a single web has been illustrated in FIGS. 1 through 3, a pair of such webs equally spaced from each other and from the side walls of the flow bend section, to thereby divide the flow bend section into three parallel and equal area conduits or branches, may be employed for viscous materials, such as resin. On the other hand, when mixing liquids of low viscosity, when mixing gases, or when mixing liquids and gases, to (providing a mixture of air and gasoline or other fuel, for example) the webs 10c, 12c, etc., may be made quite thin and may be significantly increased in number so that each flow bend section may be longitudinally divided into five, ten or more parallel branches or conduits. Further, such branches or conduits need not be all of equal width and the webs accordingly need not be all equally spaced across the width of the bend section.

Figure 4:
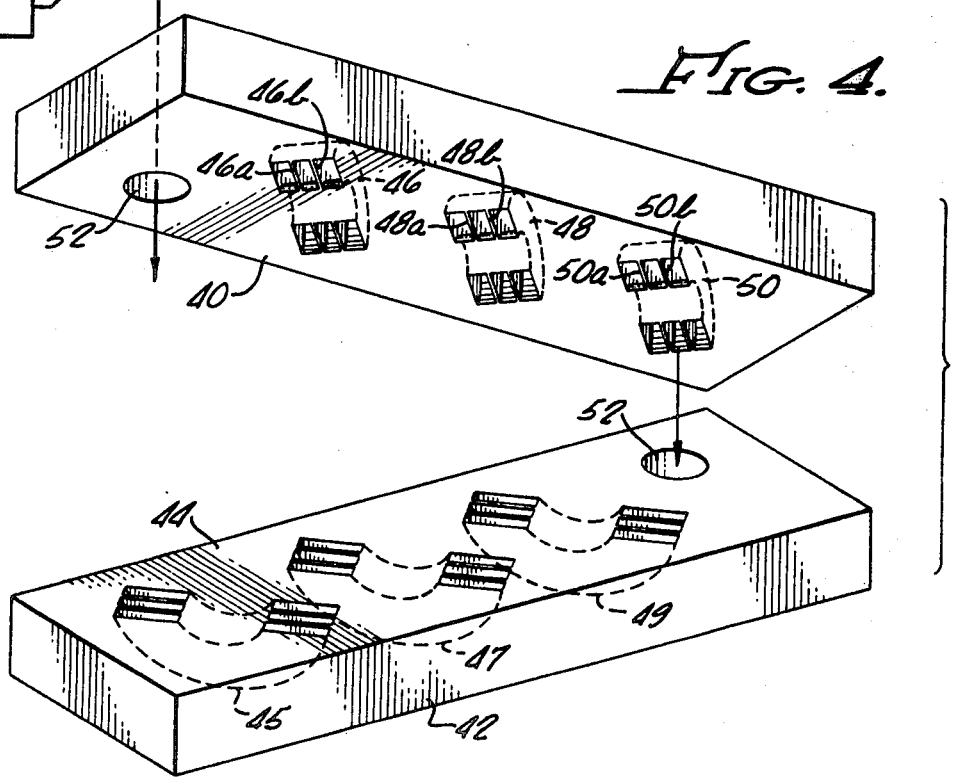
FIG. 4 is an exploded perspective view of one form of mechanization of the embodiment of FIG. 1.

Illustrated in FIG. 4 is a mechanization of the arrangement of FIGS. 1 through 3 which not only takes advantage of the availability of more than one flow divider web, but also takes advantage of a second significant benefit that derives from the bending of the flow passage about an axis angulated with respect to the direction of flow. This second benefit is the ability of such flow bend sections to collectively provide a serpentine flow passage which crosses and recrosses a dividing surface between two plates or structural sections that are detachably connected to each other along a boundary surface. Thus, the bend sections may be more readily fabricated and, even more important, are readily accessible for cleaning and repair merely by separating the several parts of the structure in which the flow passage is defined.

Such an arrangement is illustrated in FIG. 4 wherein first and second plates 40, 42 are identical with each other but are relatively turned end for end and twisted to face each other thereby to provide a facing surface 42 on plate 40 and a facing surface 44 on plate 42. The mixer sections or plates 40 and 42 are tightly connected to each other with the facing surfaces 42 and 44 in mutually contiguity and detachably retained in this position by suitable bolts, screws or other fastening means (not shown). Each of the two identical sections is formed with a number of elongated groove, such as grooves 46, 48 and 50 of plate 40. The grooves are mutually spaced from each other along a longitudinal line extending from one end of the plate to the other. Each groove extends at an angle with respect to the longitudinal extent of the plate, which angle is shown to be approximately 45° although other angles may be employed. Each groove is entirely open at the surface 42 for simplicity of manufacture and each is bent or curved in a plane normal to the surface 42 and extending along the length of the groove. Further, each groove is formed with a pair of symmetrically disposed, longitudinally extending webs 46a, 46b, 48a, 48b, and 50a, 50b. These flow divider webs extend the complete length and depth of the groove and divide the groove into three substantially equal longitudinally extending curved conduits. The webs are preferably planar, for ease of manufacture.

Each plate is formed with an input or output port 52. Port 52 of plate 40 is connected by means of fittings (not shown) to pressurized sources of flow materials A and B that are to be mixed in the static mixer. The flow materials are fed through a Y connection 54 and flow together to the input port 42 of plate 40. The materials flow through the input port 52 into the input end of groove 45 of plate 42 where the incoming stream of materials A and B is divided into three branches. The three branches flow through the three conduits of bend section or groove 45 of plate 42 and thence to the junction of grooves 45 and 46 of plates 42 and 40. Although the two plates are identical, the relative turning of the two end for end and the rotating of the two to cause them to face each other has oriented the extent of groove 46 of plate 40 at an angle (90° in the illustrated embodiment) with respect to the extent of groove 45 of plate 42. Thus, the adjacent edges of the flow divider webs of the two grooves 45, 46 are angularly positioned with respect to one another just as are the corresponding contiguous edges of webs 10c and 12c of FIG. 1. Therefore, each of the three branches of material flowing in groove 45 of plate 42 is divided into three components at this junction and further, one component of each of the branches is combined with a component of each of the other two branches to flow in one of the three conduits of the second groove or second flow bend section in this passage, namely groove 46 of plate 40.

Although the grooves have entirely open sides, they are positioned on their respective plates 40, 42 so that when the latter are placed in mating face to face contact, only ends of the grooves on the respective plates will overlap, and portions of any one groove between such ends will be closed by the mating surface of the other of the plates. Thus, the ends of the grooves will overlap in a manner substantially similar to tht illustrated in FIG. 2 which shows the bend sections in a similar arrangement of being positioned at 90° to one another, just as are the grooves of plates 40 and 42. The flowing material flows through one groove in end plate 42, then to the other end of such groove, then across the boundary surface between the plates, through groove 46 in the end plate 40, once again across the boundary and continues flowing through grooves in alternate end plates and crossing the boundary surface as the stream leaves each groove. Upon each crossing, each of the three branches are divided into three components and recombined into three other branches. Each of these branches has the components thereof mixed due to the bend of the groove. Thus, a combining, mixing, dividing, recombining and mixing repeatedly occurs as the materials flow in a serpentine path, crossing and recrossing the boundary surface, finally exiting from the output end of groove 50 of plate 40 and thence through aperture 52 of plate 42.

It will be readily appreciated that although three grooves are illustrated in each plate, fewer or larger numbers of grooves may be employed and further, fewer or larger numbers of flow divider webs may be employed in each groove.

Figure 5:
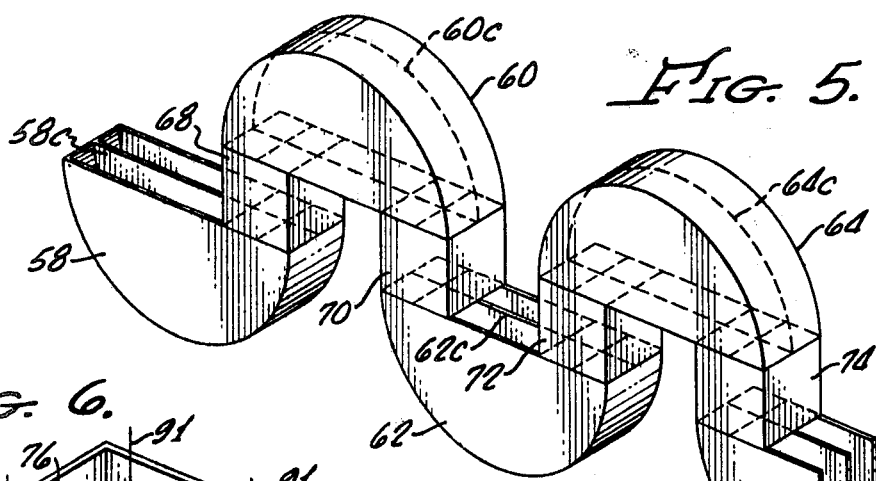
FIG. 5 illustrates a second embodiment employing flow bend sections lying in a common plane and having interposed flow rotator sections.

Illustrated in FIG. 5 is a configuration employing a plurality of flow bend sections 58, 60, 62 and 66, each identical to the bend sections 10, 12, etc., of FIG. 1, but each bending in a common plane so that a single plane will extend through the flow path of all of these bend sections. Each bend section has one or more flow divider webs 58c, 60c, 62c, 64c and 66c. However, since the webs are not angulated with respect to each other at the adjacent input and output ends of the flow bend sections, it is necessary to rotate each of the several stream branches exiting from a bend section before they are fed to the input of the next adjacent bend section. To this end, a plurality of flow rotators 68, 70, 72, 74, etc., are interposed between adjacent output and input ends of successive flow bend sections. These flow rotators divide each of the stream branches exiting from a flow bend section into two separate components, combine a component of one branch with a component of the other, and further combine the other component of the one branch with the other component of the other branch. In addition, the rotator twists or rotates the material flowing therethrough by a suitable angle so as to be properly presented to the input end of the next successive flow bend section. Each flow rotator section may be a conventional 180° rotator element, such as shown in U.S. Pat. No. 3,643,927, for example, or may take the configuration illustrated in FIGS. 6, 7 and 8. The rotator illustrated in these figures will rotate the flow through 180° and includes an input separator web 76 of a triangular configuration and an output separator web 78 also of a triangular configuration, the two being substantially coplanar and positioned with their apexes in contact. A substantially rectangular side plate 80 is joined to an edge 86 of the separator web 76 and extends along a corresponding opposite edge 88 of output separator web 78 to which it is also joined. Similarly, a second rectangular side plate 90 is joined to and extends along the edge 93 of separator web 76 and is also joined to and extends along the edge 94 of separator web 78.

Figure 6:
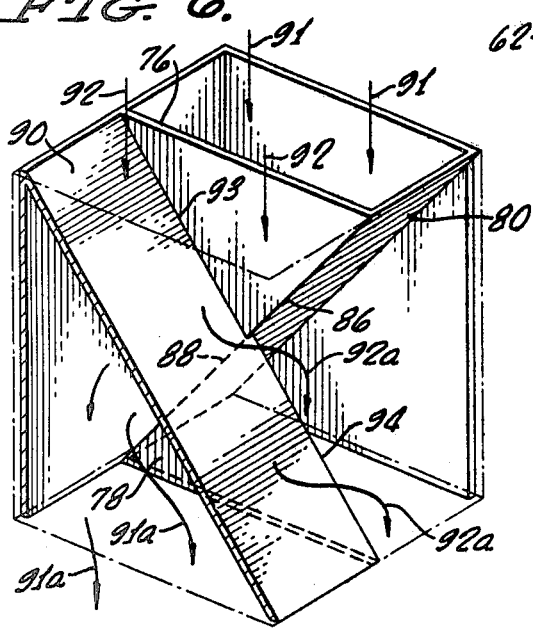
FIG. 6 is a perspective view of a 180° flow rotator section of the type employed in FIG. 5.

The rotator illustrated in FIG. 6 is preferably inserted into a rectangular aperture, illustrated in dotted lines in FIG. 6, which aperture completes the definition of the two flow rotator conduits formed by this rotator. Material flowing into the rotator of FIG. 6, into the upper end thereof as illustrated in this Figure, is divided into two separate branches by the separator web 76, with a first branch flowing down along the conduit section between web 76 and side plate 80, as indicated by arrows 91 and 91a. The inwardly flowing material is separated into a second branch and flows in this second conduit which is partially defined between the other side of the separator web 76, and the side plate 90. This branch flows inwardly to this conduit at the upper end of the rotator and outwardly (downwardly as illustrated in FIG. 6) as illustrated by arrows 92 and 92a. The rotator separates each incoming stream (it receives two or more incoming streams depending upon the number of divider webs in the bend sections) into two combined components of different branches and mixes such components by a rotating or twisting of the flow about the direction of flow. It is noted that the rotator provides a substantially linear passage although the flow does twist about the longitudinal axis of the passage as it flows therethrough. From another point of view, the cross-section of the input stream is altered, a given dimension of such cross-section decreasing and another dimension increasing as flow through the rotator progresses. The twist or cross-sectional alteration provides a mixing action.

When employed in the arrangement of FIG. 5, each rotator 68, 70, etc., has the input edge of its separator web 76 positioned at an angle (preferably, but not necessarily 90°) with respect to the contiguous edge of the bend section web, such as web 58c, 60c, etc., and has the output edge of its separtor web 78 also positioned at an angle (preferably, but not necessarily 90°) with respect to the contiguous edge of the input end of the web of the next adjacent bend section. Thus, at each junction between a bend section and a rotator section, there is a division and recombination. Each of the two stream branches exiting from each rotator is divided into two (or more if more than one web is used in the bend sections) components and components of different ones of the rotator branches are combined within each conduit or channel of the bend section. Mixing occurs in both the bend sections and the rotator sections. It will be readily appreciated that one or more rotator sections may be placed in series between any given pair of bend sections in FIG. 5, although in such cases, an additional 90° rotator section must be employed if the proper angular relation between contiguous edges of separator webs and divider webs is to be retained.

Illustrated in FIG. 9 is an exploded perspective view of a form of mechanization of the arrangement shown in FIGS. 5, 6, 7 and 8, wherein the grooves, 58, 60, etc., are formed as grooves 58d, 60d, 62d, 64d, 66d and 68d, in plates 94, 96, which have input and output flow apertures 98, 100. The grooves are formed just as are the grooves in plates 40,42 in FIG. 4, being open-sided and having one or more flow divider webs (one such divider web is illustrated). However, the bend planes of all grooves are coplanar in this embodiment. Again, the two plates 94,100 are identical to each other but are turned relatively end for end and rotated so that the surfaces upon which the grooves open are mutually facing. The grooves are positioned so that when the plates are positioned in registry with one another, an input end of groove 58d is in registry with input aperture 98 and an output end of groove 58d is in registry with an input end of groove 60d. Similarly, an output end of groove 60d in registry with the input end of groove 62d and a similar relation exists for the other grooves.

Figure 7:
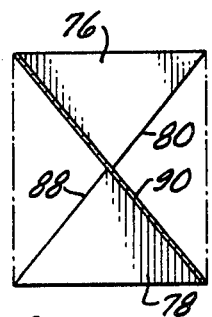
FIGS. 7 and 8 are end and side views, respectively of the rotator of FIG. 6.
Figure 8:
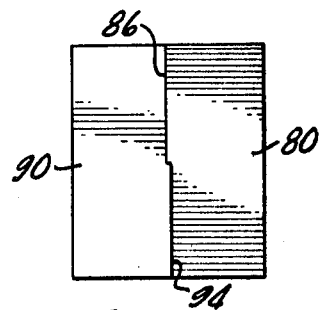
Figure 17:
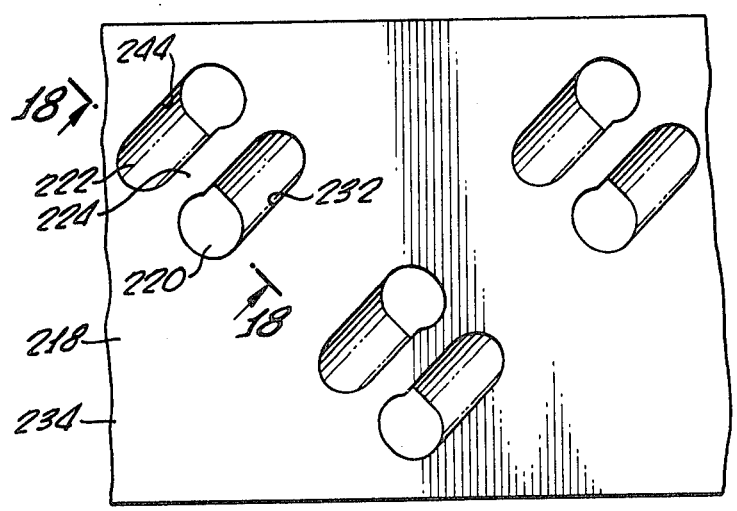
FIG. 17 illustrates a segment of an intermediate plate having a modified form of flow rotator sections.
Figure 18:
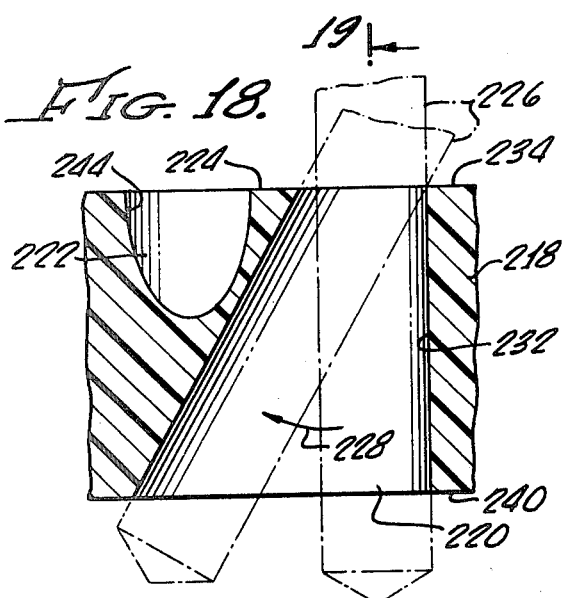
FIG. 18 is a section taken on lines 18—18 of FIG. 17.

The 180° rotators are formed in an intermediate plate 102 having apertures 104, 106 in registry with apertures 98, 100 and having a plurality of rectangular apertures 108, 110, 112, 114 and 116 in each of which is mounted a flow rotator such as illustrated in FIGS. 6, 7 and 8 to thereby provide in plate 102 a plurality of flow rotator sections each of which is interposed between input and output ends of adjacent bend sections. Those portions of the grooves forming their respective bend sections which are not in registry with one of the rotator sections contained in apertures 108 through 116, are closed by a contiguous surface portion of plate 102 between the respective apertures 108 through 116 and thus, just as in the embodiment of FIG. 4, the arrangement causes each of the grooves to form a closed flow bend section. End plates 94, 96 are detachably connected together, with intermediate plate 102 interposed and in fact to face contact with the end plates, by bolts (not shown) extending through all of the plates. More mixing may be achieved in the arrangement of FIG. 9 by employing longer plates with more grooves and rotators, by employing more intermediate plates to provide more than one rotator between adjacent bend sections of the flow passage, or by a combination of these.

Illustrated in FIG. 10 is an embodiment of the present invention that is presently preferred. A mixer structure comprises a pair of end plates 120,122 and a plurality of intermediate plates 124, 126, 128 and 130 interposed between the end plates and all detachably connected together by suitable fastening means such as bolts, screws or the like (See FIG. 14) to form a unitary laminated body. A serpentine flow passage is formed in the laminated body so that it crosses and recrosses each of the boundary surfaces 132, 134, 136, 138 and 140 between adjacent ones of the plates 120 through 130. The two end plates 120 and 122 are identical to each other and may be identical to the plates 40, 42 of FIG. 4, although in this embodiment six grooves 150, 152, 154, 156, 158 and 160 are formed in each of the end plates 120, 122 as illustrated for plate 120 in FIG. 11. Each of the grooves has face opening through the inwardly facing surface of its plate, and each is curved as illustrated in FIG. 12, bending about an axis perpendicular to the direction of flow therethrough. Each of the grooves is provided with a plurality of flow divider webs such as webs 150d and 150e illustrated in FIG. 13. Preferably, each end plate including its grooves and the webs therein is molded as an integral unitary plate although other methods of forming the grooves and divider webs may be readily employed. As best shown in the exploded perspective view of FIG. 14, each of the intermediate plates 124, 126, 128, 130 is formed with apertures 124a, 124b, 126a, 126b, 128a, 128b, 130a, 130b, at opposite ends of the plates, and which are in registry, as illustrated, with one or the other of the input-output apertures 170, 172 formed in plates 120 and 122, respectively.

Each of the intermediate plates is provided with a group of rectangular cross-section apertures 174a through 174x, 176a through 176x, 178a through 178x, and 180a through 180x. In each of these apertures is positioned a flow rotator element thereby providing a flow rotator section analagous to the flow rotator elements and flow rotator sections of the embodiment of FIGS. 5 through 9. Preferably, the flow rotator sections of FIGS. 10 through 14 will provide a 90° rotation and have the input edges of their separator webs oriented at an angle other than 180° (preferably at an angle of approximately 90°) with respect to one another. Thus, each will provide a 90° flow rotation instead of the 180° flow rotation of the embodiments of FIGS. 5 through 9. These 90° rotators may be conventional elements such as those shown in U.S. Pat. Nos. 3,652,061 or 3,286,992 or 3,239,197 and other similar arrangements. However, it is preferred to employ flow rotator passage sections of rectangular cross-section to better mate with the adjoining ends of the grooves formed in the end plates 120, 122. Accordingly, the several intermediate plates 124 through 130 have the apertures 174a, etc., thereof formed with rectangular cross-sections. Rotator elements of the type illustrated in FIG. 15 (and more specifically described below) are either inserted or formed therein.

The rotator elements of this embodiment, just as the rotator elements of FIGS. 6, 7 and 8, may be separately formed and inserted into the rectangular apertures of the intermediate plates or, alternatively, they may be molded integrally with the intermediate plates. For use with the four intermediate plates of the embodiment of FIG. 10, four rotator elements 190, 192, 194 and 196 are positioned between each pair of adjacent bend sections. Preferably, the rotators are of successively opposite hand to provide oppositely directed rotation. In other words, considering flow from the bottom to the top in the exploded illustration of FIG. 15, with materials flowing upwardly through these rotator elements, one after the other, element 190 will provide a counter-clockwise rotation, element 192 will provide a clockwise rotation, element 194 will provide a counter-clockwise rotation and element 196 will provide a clockwise rotation. Each of the rotator elements is identical to each other except for the opposite-handedness and each comprises a substantially triangular input separator web 198 having edges 200, 202, (which may be either curved, as shown, of straight) that are joined to inwardly facing edges of corresponding rectangular side plates 204, 206. The latter may also be either curved, as shown, or staight, and have aligned end edges which collectively define a rotator section output edge 208 which is oriented at an angle (preferably at 90°) to the input edge 210 of the separator web 198. Further, each rotator element is positioned at 90° with respect to both adjoining rotator elements so that the output edge 208 of one rotator section is positioned at 90° with respect to the input edge 210a of the next adjacent rotator element. Similarly, the input edge 210 of the first of the series of four rotator sections is positioned at an angle (preferably 90°) with respect to the extent of the contiguous edges of the webs of the adjoining flow bend section or groove. Further, the final one of this series of four rotator sections has its output edge 280c positioned an angle (preferably 90°) with respect to the contiguous edges of the webs at the input end of the adjacent groove of the other end plate. The several plates may be molded of a suitably plastic. The grooves, divider webs, and rotator webs may be integrally molded with the plates or the webs may be separately formed and inserted as by a friction or press fit, into the apertures and grooves molded in the plates. Such separate webs may be formed with bent tabs or ears 195, 194 to facilitate positioning. If necessary or desirable, higher strength metal reinforcing plates may be used on the outer most sides of the laminated stack for increased strength.

The rotators illustrated in FIG. 15 are either inserted or integrally formed in the several apertures of the intermediate plates 124, 126, 128 and 130, in mutual registry with each other, and in registry with respective output and input ends of adjacent bend sections of end plates 120, 122. A similar group of four rotator sections is interposed between output and input ends of each pair of adjacent bend sections to provide a serpentine flow passage which crosses and recrosses each of the boundaries between the several plates of the laminated body from the input at port 170 of plate 120 to the output at port 172 of plate 122. FIG. 16 illustrates a portion of this flow passage from the output end of bend section 151 through the input end of bend section 153. Input material flows through port 170 and thence through successive ones of apertures 124a, 126a, 128a and 130a to the input end of groove 151 where the material is divided into three branches by the planar webs 151c and 151d. The material flows in these three branches, bending along the bend section 151, until the output of the bend section is reached at which point the edge 210 of the input end of the divider web of rotator 190 is reached and divides each of the three branches in two separate components. The component of one branch is recombined and mixed with components of each of the other two branches. This dividing, mixing and recombining continues as the material flows through the four rotators in sequence until the input end of the next bend section 152 in plate 120 is reached. Here each of the two branches is split into three components by the three divider webs of this bend section and components of the two branches from the rotator are mixed in each of the three channels or conduits of the bend section. The material now flows through the bend path of bend section 152, undergoing further mixing, and then flows through the junction of the output bend section 152 and the input of the first of the next series of rotator sections 196a, 194a, 192a and 190a. A similar dividing, mixing and recombining occurs through this series of linear rotator sections as the flowing material crosses each boundary of the laminated body to enter the next adjacent bend section, which is bend section 153 in the other end plate 122. The flowing material continues this serpentine path flowing through each bend section and thence through a group of aligned rotators of the intermediate plates and then through the next bend section of the next end plate until it flows from the final bend section 160 of plate 120 through the output apertures 124b, 126b, 128b, 130b and thence through the output port 172.

It will be seen that a relatively compact mixing structure is provided having a long mixing path which is folded upon itself so as to require relatively less space. The several plates are detachably connected to each other by fastening elements (FIG. 14) similar to the through bolts shown in FIG. 30. Merely by removing the fastening elements that securely connect the several plates to each other, the plates may be mutually separated to provide ready access to each of the bend and rotator sections which may thereby be readily cleaned or repaired as required. As previously mentioned, the several adjacent edges, such as edges 208, 210a of the 90° rotator elements and the similar edges of the rotator elements and the edges of the bend section webs need not be in actually physical contact but are preferably relatively close to each other.

The rotator elements illustrated in FIG. 6 as previously mentioned, may be integrally molded as part of the separator sheets or formed as separate bent sheets, bent into the illustrated configurations, and inserted into corresponding rectangular apertures of the intermediate plates. In the latter case, the rotator elements may be formed with laterally extending tabs such as tabs 195, 197 illustrated in FIG. 15. These tabs extend outwardly beyond the perimeter of the intermediate plate aperture that receives the bent plate of the rotator and thus hold the rotator in position, preferably being located on the upstream side of the rotator whereby the tabs will bear against the surface of the intermediate plates and resist the downstream forces exerted by the stream of flowing material upon the rotator element.

Figure 19:
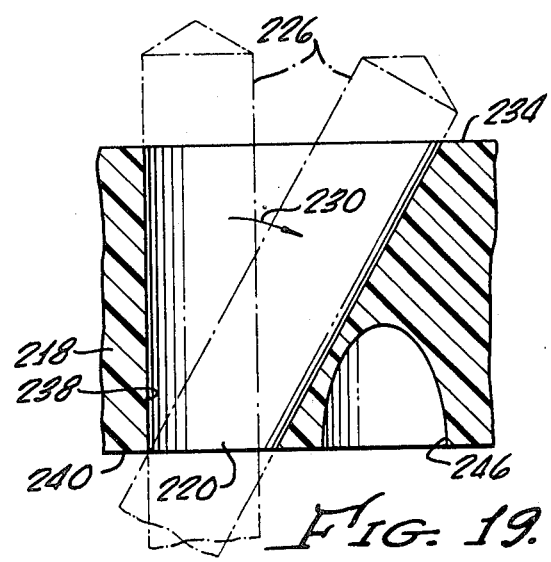
FIG. 19 is a section taken on lines 19—19 of FIG. 18.
Figure 20:
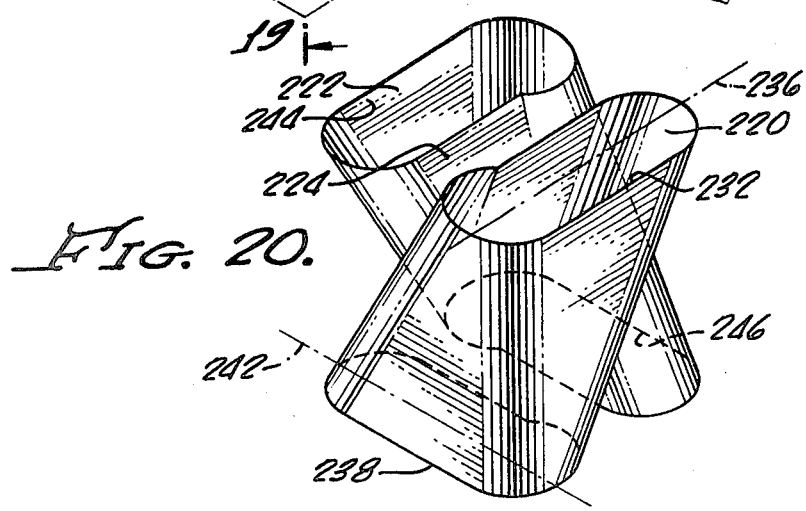
FIG. 20 is a schematic perspective illustration of the flow rotator element of FIG. 17.

Illustrated in FIGS. 17 through 20 is a modified form of rotator which may be integrally molded as part of the intermediate plates or formed in the solid body of the plate by a relatively simple drilling operation. Each rotator includes a first and second channel or conduit 220, 222 mutually divided or separated by a web 224. To form the rotators of FIGS. 17 through 20 in a solid plate, a drill bit 226 (FIG. 18) is employed to drill vertically downwardly as illustrated by the vertical position of the bit and the drill is then rotated about an axis perpendicular to the plane of the paper and in the direction of arrow 228 as it is cutting to enlarge the lower portion of the drilled aperture and thus provide, in a first step, a substantially triangular aperture. The drill bit 226 is then inserted from the other side of the plate 218, as illustrated in FIG. 19, into the aperture formed by the first drilling operation. Then the bit is rotated, as it cuts, about an axis perpendicular to the plane of the paper, as illustrated in FIG. 19 in the direction indicated by arrow 230 to thereby enlarge the upper end of this conduit. Thus, the conduit, such as conduit 220 is formed, (FIG. 20) having a mouth 232 at one side 234 of plate 218 that is elongated in a first direction as indicated by a line 236 and having a mouth 238 lying in the plane 240 of the other side of plate 218 that is elongated in a direction indicated by line 242 that is positioned at 90° with respect to line 236.

Conduit 222 may be formed by a similar set of drilling operations so as to provide a mouth 244 in the plane of surface 234 that is elongated in a direction substantially parallel to line 236. Conduit 222 also has a mouth 246 lying in the plane of surface 240 of plate 218 that is elongated in a direction parallel to the line 242.

A modified form of flow passage bend section is illustrated in FIGS. 21-25 of which FIG. 21 illustrates a bend section analagous to section 10 of FIG. 1. The bend section of FIG. 21 is modified to provide not only a bending of the flow path about an axis perpendicular to the flow direction and a division of the flow streams entering the bend section, but also a mixing action by alteration of the flow cross-section. Like flow section 10, the flow bend section 250 shown in perspective view in FIG. 21, comprises a hollow tube having a substantially rectangular cross-section with flat and mutually parallel side walls, although a cross-section of any shape may be employed. The tube has inserted therein a number of flow divider webs which, in this case, are not planar but curved as particularly illustrated in the exploded perspective view of FIG. 23. The webs include those indicated at 254, 256, 258, although other numbers of such webs may be employed. Conveniently, the webs are cut from half sections (longitudinally split) of circular tubing, with webs 254 and 258 cut at an angle, such as an angle of 65° relative to the split tube axis, for example, and the intermediate web 256 cut at a 90° angle. The webs are detachably inserted in and secured to, as by a friction fit, the tube 252 one inside the other as shown in the drawings. All of the edges of the webs extend across the tube in a direction more or less the same as the direction of the axis about which the flow path bends. These web edges are all coplanar with each other and with the edges of the tube 250. Thus, tube 252 has end edges 252a, 252b and side edges 252c and 252d which are coplanar with the edges 254a and 254b of web 254, edges 256a and 256b of web 256 and edges 258a and 258b of web 258. Sectional views of FIGS. 24 and 25 show additional details of this flow bend section that bends and alters cross-sectional configuration of the flowing stream.

The flow divider webs of the flow bend section of FIGS. 21-28 include two webs 254 and 258 which are bent to substantially follow the bend in the flow path and, which in effect, are twisted relative to the path, along the length of the path. If the bent flow path is developed, that is, laid out in a straight line, it will be seen that input edge, such as edge 254a of the divider 254 extends across the flow path at a first angle relative to the path and the output edge 254b of divider 254 extends across the flow path at a second angle relative to the path. Thus, there is provided a web effectively having a 180° twist with its opposite edges extending across the passage at mutually different angles. Therefore, this flow bend section also provides a flow rotation, that is, the passage section provides a flow path that both bends about an axis perpendicular to the direction of flow and also twists about the flow direction itself. This flow bend section, having the skewed and curved dividers, may also be formed as a groove in an end plate of a two layer stack of multi-layer stack of plates and may be employed in just the same fashion as are the bend sections of any of the previously described embodiments.

Figure 26:
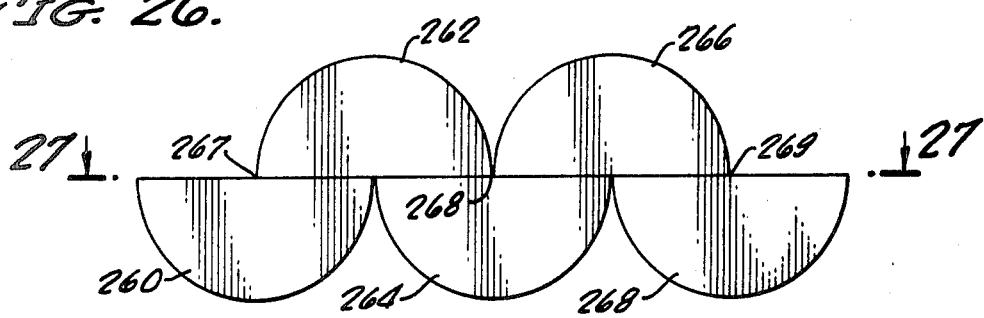
FIG. 26 illustrates an arrangement of aligned flow bend sections of the type shown in FIG. 21, connected to provide a mixer.
Figure 27:
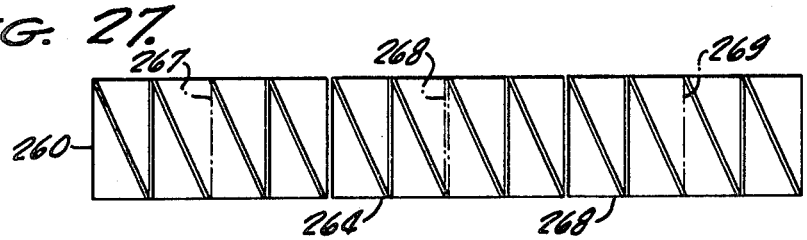
FIG. 27 is a section taken on lines 27—27 of FIG. 26.

These tubular bend sections may be used in a system analagous to that of FIG. 5 but need not employ interposed flow rotators. Such an arrangement is shown in FIG. 26 wherein a number of the flow bend sections of FIG. 21, identified as sections 260, 262, 264, 266 and 268 are interconnected by suitable means (not shown) so as to provide a continuous serpentine path through the several sections in succession. FIG. 27 is a section taken on lines 27—27 of FIG. 26 showing the lower most bend sections 260, 264, 268 in solid lines and showing the end edges identified as 267, 268 and 269 of the upper flow bend sections 262, 266 in dotted lines. Consider one pair of flow bend sections in the relative orientation of FIG. 26 with one such section inverted and having one-half thereof overlapping one-half of a lower bend section. A relation exists as may be seen in FIG. 22, wherein an end edge of an upper flow bend section will be positioned as indicated by dotted line 272 of FIG. 22, and the edges of its two skewed divider webs, corresponding to webs 254 and 258, will be positioned as shown by dotted lines 274, 276. Thus, a stream branch entering the end of tube 250 is divided into four branches indicated at 278, 280, 282 and 284. Material entering conduit or branch 278 exists at 278a. Material entering conduit 280 exits at 280a. Material entering at branch 282 exits at branch 282a and material entering branch 284 exits at branch 284a. The flow branch exiting at 278a and also the flow branch exiting at 280a are both divided into two sub-branches by the edge 276 of a web of the next successive flow bend section and portions of the streams exiting from 278a and 280a are combined with each other in this next successive flow bend section. Similarly other recombinations and divisions occur to provide the desired mixing. In the course of flow through any one of the conduits of one of these bend sections, such as through the conduit having an input identified as 278, the flowing material has its cross-sections significantly distorted to provide improved mixing of the streams combined therein.

Figure 28:
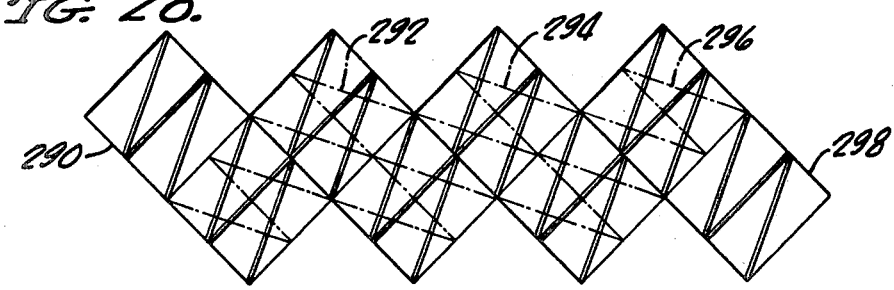
FIG. 28 illustrates an alternate arrangement of the flow bend sections of FIGS. 21-25.

Flow bend sections of the type illustrated in FIGS. 21–26 may be combined in a number of different fashions to provide a serpentine flow passage for mixing. An alternative arrangement is illustrated in FIG. 28 wherein such flow bend sections, identified as 290, 292, 294, 296 and 298 are connected in a manner similar to that illustrated in FIG. 26 but with the longitudinal extent of each bend section being angularly related to the longitudinal extent of an adjacent bend section. The angularly relation shown is 90° although other angles may be employed. Illustrated in dotted lines in FIG. 28 are the relative orientations of the contiguous or near contiguous edges of the divider webs of two adjacent bend sections. From this illustration and the illustrations of FIGS. 22 and 27, it may be seen that the angular relation of the longitudinal extent of adjacent ones of these flow bend sections may be varied without the necessity of interposing a flow rotator as in the arrangement illustrated in FIG. 5, for example. Nevertheless, the cross-section altering flow bend sections of FIGS. 21–28 may be formed as grooves in plates, just as described in connection with the previously illustrated bend sections having planar webs, and may be used with or without various members of intermediate plates having interposed flow rotator sections therein.

Although the flow bend sections of FIGS. 21–28 and also those shown in FIGS. 1–14, may be formed as grooves which define passages having flat and mutually parallel side walls, it will be readily understood that other cross-sections of such flow bend sections may be employed. However, the arrangement of a flow bend section having flat and mutually parallel side walls readily lends itself to the configuration of FIGS. 21–28 because in such a configuration the flow divider web may be defined by a segment cut at an angle from a longitudinally split right circular cylinder and thus these divider webs may be readily manufactured from longitudinally split tubing that is cut into sections along a line that is angularly related to the cylinder axis.

It will be readily appreciated that an arrangement, such as that illustrated in FIGS. 10 and 14 may be employed without the end plates, using solely a stack of intermediate plates and thus provide a number of mutually independent and separate flow passages each defined by a series of mutually registering rotator elements. In such an arrangement one or several multiple passage mixers or a number of individual mixers would be provided in one laminated body formed of a stack of intermediate plates analagous to the intermediate plates of FIG. 14 by feeding a single stream of material to be mixed to all of the rotator elements of the first plates (via a manifold) or several streams to several groups of rotators, or individual streams to individual rotators. Such independent mixers (of a stack of plates having arrays of rotators) may be used simultaneously to mix a number of different multi-component material streams or may be employed independently, one after the other, as one series of rotators that define a first mixer becomes inoperable for one reason or another. Further, the laminated body is still readily disassembled to allow cleaning or other servicing of the individual elements of each of the mixer passages. Thus, an arrangement employing only the intermediate plates of the embodiment of FIG. 10 would provide a single laminated body in which are formed one, ten, fifty or more substantially linear passages having means for dividing, mixing, combining and recombining, such means including a number of the illustrated flow rotator sections. Such an arrangement (with input and output manifolds) is useful in providing a number of effectively parallel mixer passages, to thereby increase the total cross-sectional area of the mixer. When used for gases and low viscosity liquids, a large number of individually small mixer passages may be formed cheaply in each of a large number of plates. The plates are economical to manufacture and may be readily assembled and disassembled for cleaning, as previously described.

Figure 31:
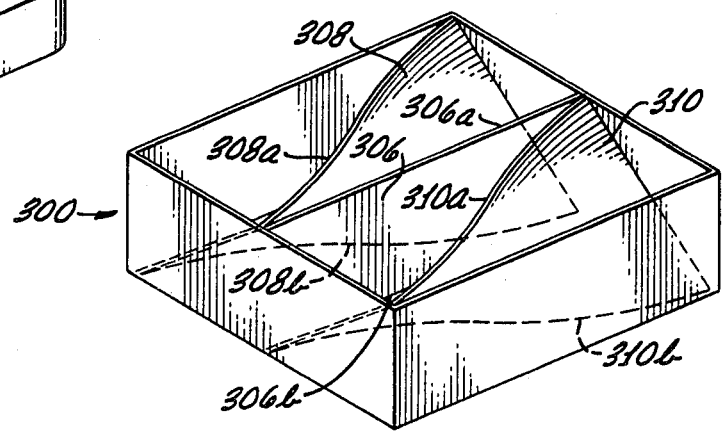
FIGS. 31 and 32 illustrates details of right and left handed multiple flow rotator segments.
Figure 32:
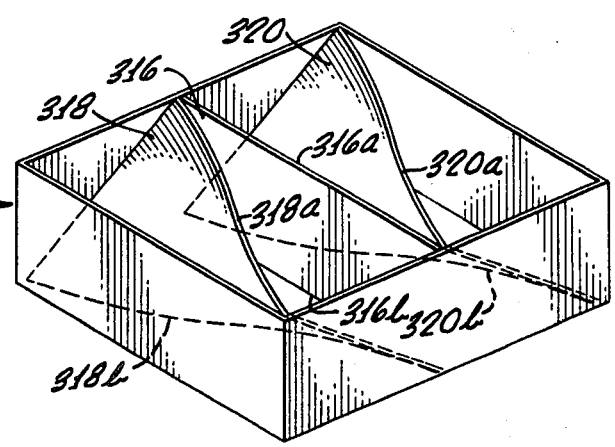

FIGS. 29–32 show a modified rotator particularly arranged for use in a stack of multiple rotator plates (without bend sections). These figures show an arrangement employing multiple rotators that are formed in a single plate or mixer segment of which a large number are stacked to align the rotators therein and detachable bolted together. In the arrangement of FIGS. 29–32 a unique multiple rotator is employed. Thus, a plate or segment 300 is provided having apertures 301, 302, 303 and 304 for reception of connecting bolts 301a–304a and formed with a substantially rectangular flow passage or aperture extending entirely therein through. The passage in this embodiment is square and is divided into two equal rectangular passages or aperture sections by a planar web 306 extending entirely therethrough. Each of the two rectangular aperture sections on the two opposite sides of web 306 is itself divided into two twisting flow passage branches by means of a single twisted web 308, 310, respectively. The arrangement of the planar and twisted webs is best seen in the schematic perspective views of FIGS. 31 and 32 showing the planar web 306 having an upper edge 306a and a lower edge 306b which divides the square passage into two rectangular sections. The first twisted web 308 has a first edge 308a extending more or less diagonally across one end of the passage on one side of web 306 and has a second edge 308b extending across the other diagonal of the other side of the passage so that the opposite edges 308a and 308b of the twisted web 308 are angularly related to each other. Similarly, the second twisted web 310 has a first web edge 310a extending substantially diagonally across the passage and substantially parallel to the web edge 308a and has a second edge 310b angularly related to the first web 310a and substantially parallel to the web edge 308b of the other web of this pair. The arrangement illustrated in FIG. 31 may be called a right-handed element. A substantially identical but opposite hand, or left handed, multi-rotator element is employed together with the right handed element of FIG. 31. Such a left handed element is illustrated in FIG. 32 as including a square flow passage divided into two rectangular flow passages or aperture sections by a planar web 316 having opposite edges 316a and 316b. Each of the rectangular passages of this left handed element is divided into two subbranches or conduits by twisted webs 318, 320 having respectively angularly related edges 318a and 318b for the one web and edges 320a and 320b for the other web.

Figure 30:
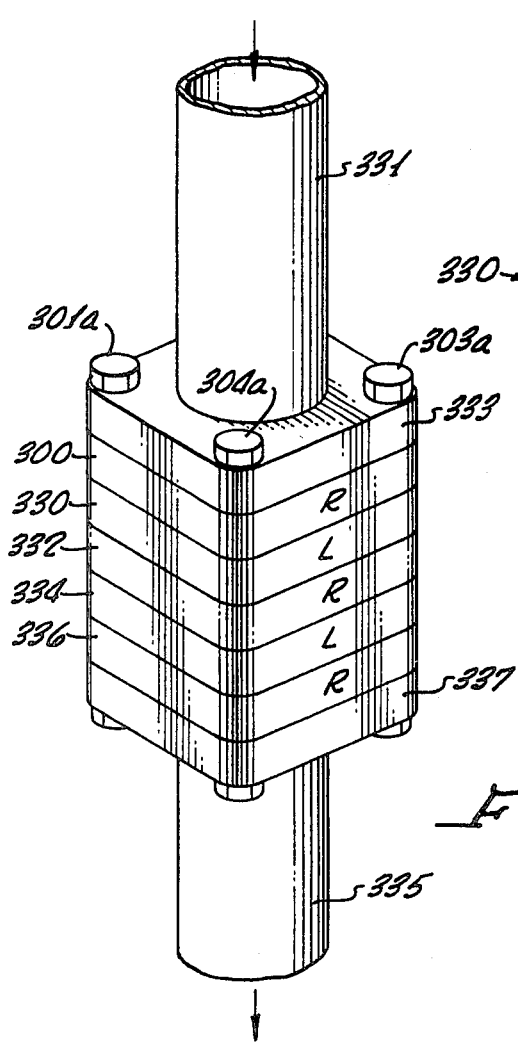
FIG. 30 illustrates a stack of multiple flow rotator segments.

When assembled, the several multiple rotator segments are stacked one upon the other in an aligned relation as illustrated in FIG. 30 with elements of opposite handedness alternating so that each right handed element (R) is flanked by a pair of left handed elements (L) and each left handed element is flanked by a pair of right handed elements except for the end most elements. Not only are the elements alternated according to handedness but all the left handed elements are oriented at an angle (preferably 90°, as illustrated) with respect to all the right handed elements. Thus, FIGS. 31 and 32, respectively, may be considered to illustrate an exploded schematic view of a pair of opposite handed elements in their relative orientation in the stack of FIG. 30. With this mutually angulated orientation of adjacent segments the passage of one segment will extend across and communicate with both passages or aperture sections of the next adjacent segment and each web of such next adjacent segment will divide each of the four streams exiting from the prior segment.

A flowing mixture arriving at, for example the upper surface of multiple rotator element 300 of FIG. 31 is divided into four branches which exit from the rotator element at the lower end thereof, being separated by the several webs 306, 308, 310. In the assembled configuration of FIG. 30, edge 306b of web 306 is contiguous, or nearly contiguous to, and angularly related (by 90°) to the edge 316a of the next lower left handed element 330. Similarly, output edge 310b of twisted web 310 is contiguous or nearly contiguous to and angularly related to the input edge 320a of web 320 of the next lower multiple rotator section 330 and output edges 308b is contiguous or nearly contiguous to and angularly related to the input edge 318a of web 318. Thus, each of the four streams exiting from an upper right handed multi-rotator element is divided in two at the input edges 316a, 318a, 320a of the next lower opposite handed multi-rotator element which itself provides for twisting cross-sectional altering flow paths to further recombine and mix the flowing material. The material continues down through the stack of multi-rotator elements 300, 330, 332, 334, 336 as indicated by the arrows of FIG. 30, being divided, recombined and mixed until it flows out through the output conduit 335 of the stack. Conveniently, input to the mixer of FIG. 30 is provided via a conduit 331 (which receives a stream of materials to be mixed) and an input manifold segment 333. Input is provided to conduit 335 via an output manifold 337. Obviously, the number of segments in a stack of the type shown in FIG. 30 may be varied to meet specific desires or requirements.

It will be readily appreciated that, although the embodiment illustrated in FIGS. 29–32 shows a pair of rotators in each multiple rotator segment, other numbers of rotators may be used for each segment. Thus, a single segment may include the illustrated square passage divided into three or more passage sections each having a corresponding twisted web therein. Such a multiple passage rotator segment of one handedness would be flanked by similar triple passage rotator elements of opposite handedness that are turned at a 90° relation to the first and a stack of similar triple passage segments of alternate handedness and alternately oriented at 90° may be employed in a manner illustrated in FIG. 30.

Figure 33:
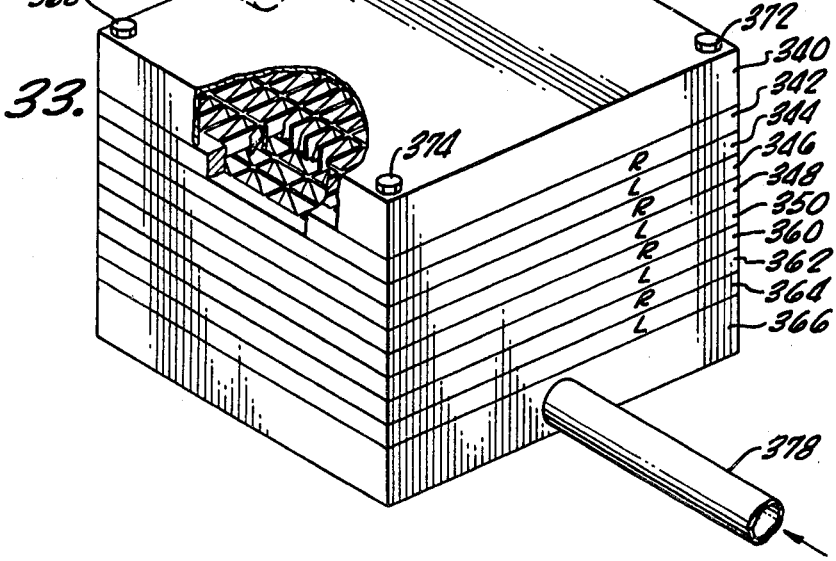
FIG. 33 is a perspective view, with parts broken away, of a unitary laminated mixer body incorporating a plurality of arrays of multiple rotator setments of the type shown in FIGS. 31 and 32.
Figure 29:
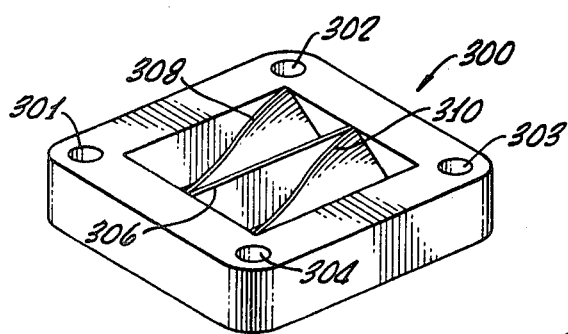
FIG. 29 illustrates a single segment of a stack of detachably connected multiple flow rotator segments of another form of my invention.

For mixing larger quantities of materials a mixer may be employed as illustrated in FIG. 33 comprising a stack of mixer plates 340–366 all connected together by bolts 368, 370, 372 and 374. End plates 340 and 336 comprise output and input manifolds, respectively, having an output conduit 376 and an input conduit 378. Each one of intermediate plates 342–364 is formed with an array of a number of mutually contiguous multiple rotator elements of the type illustrated in FIGS. 29, 31 and 32 (although multirotator elements with two or more planar webs may also be used). Each individual multiple rotator elements of one plate corresponds to and is substantially identical to an element of FIG. 31 or FIG. 32, with individual elements of one plate being in registry with a corresponding element of adjoining plates and also oriented at 90° relative to the elements of such adjoining plates. This arrangement provides a large number of parallel mixing paths, each path being substantially identical to the path of the embodiment of FIG. 30 and each path including four separate flow boundaries in each segment or plate. The multi-rotator elements of the adjacent plates are of mutually opposite handedness as described in connection with FIGS. 31 and 32, with all the elements of one plate being of one handedness and all the elements of an adjacent plate being of opposite hand. Elements on any one plate may be given handedness with respect to elements of the same plate since it is only necessary to maintain the relation of opposite handedness between adjoining rotator elements and not between adjoining plates. However, it is more convenient to make any one plate with rotator elements of the same handedness. In use of the mixers of FIG. 33, materials of low viscosity, such as air and fuel, for example, are connected to be fed to input conduit 378 which feeds the mixture to manifold plate 366. The latter evenly distributes the mixture to all of the multiple rotator elements of plate 364. The material then flows through the array of flow rotator apertures, flowing through mutually registered and aligned passages of adjoining plates, and being divided, mixed and recombined as it flows. All the flowing material is combined in the chamber defined in output manifold plate of 340 and thence exits through output conduit 376.

The described mixing arrangements and particularly those illustrated in FIGS. 30 and 33 are readily adapted to air fuel mixtures and may be employed in an internal combustion engine, for example, to receive a mixture of air and gas from a conventional carburetor and to further mix such a mixture to provide a improved fuel mixture to the input of the engine intake manifold.

Although the various mixer arrangements are particularly well suited for mixing curable materials that may be difficult to clean from conventional mixers, a surprising and unexpected improvement has been observed in mixing of gases and low viscosity liquids.

There has been described various methods and apparatus for mixing flow materials which employ novel flow bend sections that not only provide a unique mixing action by means of a bent flow path, but also enable division of the particle streams or material streams into many different branches and further enable construction of a flow passage in a number of sections that are readily accessible for cleaning and repair upon disconnection of the sections of the passage structure. The inventive concepts lend themselves to numerous arrangements and configurations and only some of these have been described and specifically illustrated herein.

The foregoing detailed description is to be clearly understood as given by way of illustration and example only, the spirit and scope of this invention being limited solely by the appended claims.

What is claimed is:

1. A static mixer comprising:
   a plurality of mixer segments, each formed with an aperture therein, and means for detachably connecting said segments to one another to form a unitary laminated body, the apertures of each segment being in registry with corresponding apertures of immediately adjacent segments;
   each of said apertures being rectangular and having a web positioned therein, each of said webs having a first edge extending diagonally across one end of its respective aperture from one corner thereof to the opposite corner; and a second edge extending diagonally across the other end of its aperture between the other two opposite corners of the aperture; the mid-portion of said web being substantially parallel to the side walls of said aperture; and
   adjacent edges of webs in mutually registering adjacent apertures of different ones of said segments being positioned at an angle with respect to one another.

2. A static mixer comprising:
   a plurality of mixer segments, each formed with an aperture therein, and means for detachably connecting said segments to one another to form a unitary laminated body, the apertures of each segment being in registry with corresponding apertures of immediately adjacent segments;
   each of said apertures being rectangular and having a divider therein which divides it into two side-by-side rectangular aperture sections;
   a web positioned within each of said aperture sections, each of said webs having a first edge extending diagonally across one end of its respective aperture section from one corner thereof to the opposite corner, and a second edge extending diagonally across the other end of the aperture section between the other two opposite corners of the aperture section; and
   adjacent edges of webs in mutually registering adjacent apertures of different ones of said segments being positioned at an angle with respect to one another.

* * * * *